Patented June 5, 1928.

1,672,584

UNITED STATES PATENT OFFICE.

JOHN T. TRAVERS, OF COLUMBUS, OHIO, ASSIGNOR, BY DIRECT AND MESNE ASSIGNMENTS, TO THE TRAVERS-LEWIS PROCESS CORPORATION, OF COLUMBUS, OHIO, A CORPORATION OF OHIO.

PROCESS OF AND MATERIAL FOR TREATING SEWAGE AND INDUSTRIAL WASTE.

No Drawing.   Application filed May 20, 1927.   Serial No. 193,070.

This invention relates to an improved process for treating domestic sewage and industrial waste as well as the provision of a novel material for use in the purification of treatment of sewage and waste.

The invention further contemplates the utilizing of certain waste products from the manufacture of cement as a reagent in the process of treating sewage and industrial waste.

My process is, in a large degree, predicated upon the discovery that the bacteria and putrescible matter present in sewage and industrial waste are principally colloids and that the colloidal matter contained in the sewage or waste is the all important part thereof. The biochemical oxygen demand of sewage or waste has been proved to be due largely to the colloids. The colloidal matter content of the secretions and excretions of the human body is very high. About 80% of fæcal matter vigorously shaken with water is colloidal and about 85% of the entire oxygen demand of the solution is due to the colloidal fraction.

Colloids are characterized by their inability to diffuse through dialyzing membranes and may be isolated by this means.

Since the bacteria and putrescible matter in sewage are colloids, it is evident that any process for treating sewage which may not cope efficiently with the colloidal matter, cannot efficiently perform the function of sewage purification.

Heretofore the treatment of sewage has been founded largely on the idea that the bacteria will consume the organic matter in the sewage. Bacterial cells are rich in protein. The multiplication of bacteria in sewage is essentially the changing of one protein into another, namely, the changing of the proteins in sewage to bacterial proteins. I find that the putrescible matter is not consumed by the bacteria but that there is merely formed another putrescible protein which in many instances, is just as putrescible as the original protein. My process, therefore, contemplates the precipitation and removal of these colloids from the sewage and industrial waste treated. I have further discovered that colloids are not isolated ions or molecules but aggregates of molecules or ions and molecules, and lie between the point of suspension and the point of solution. They are neither in suspension nor solution but are in dispersion. As the colloids migrate in an electrical field under the influence of an electrical current, they necessarily must be charged. Generally it may be said that they are positively charged in an acid solution and negatively charged in an alkaline solution. The sign of the colloids may be changed by the addition of an acid or an alkaline solution. In fresh sewage, the colloids are usually negative as the sewage has an alkaline reaction. As sewage becomes septic it will, under ordinary conditions, become acid and the sign of the colloids will be positive.

I find that the colloids may be precipitated from an alkaline solution, the sign of the colloids being negative, by the addition of an electrolyte supplying an excess of positive ions. For this reason, an alkali such as hydrated lime is added to the sewage or waste undergoing treatment in slight excess so as to produce an alkaline condition in the material, the sign of positive colloids being thereby changed to negative while the sign of any negative colloid will remain negative.

Once an alkaline condition has been produced in the sewage or industrial waste, it will be understood that all the colloids are negatively charged. To effect a precipitation of the colloids it is necessary to change them from the condition of dispersion to one of suspension. This is accomplished by neutralizing the charge of the colloids and destroying their stability in the sewage or industrial waste. The neutralizing of the charge of the colloids is effected by introducing an electrolyte which dissociates, forming positive and negative ions. The negative colloids unite with the positive ions of the electrolyte, thereby neutralizing the charge of the colloids. The colloids having thus been changed from a condition of dispersion to one of suspension and their stability destroyed, may be readily carried down by a suitable coagulant such as iron sulphate or aluminum sulphate.

Concurrently with the uniting of the positive ions of the electrolyte with the negative colloids, there is a release of negative ions from the electrolyte which acts on the water solution, effecting a release of nascent oxygen, which materially assists in the destruction of bacteria and produces an effluent containing a very substantial quantity of dissolved oxygen. No reaeration of the effluent will be found necessary.

While it is possible to employ other electrolytes in carrying out the process, I find that a waste product from the manufacture of cement constitutes an excellent electrolyte producing material and in the process specifically herein described, such an electrolyte producing material is employed. This electrolyte producing material represents the dust collected from the electrical and mechanical precipitators used to collect the waste dusts of the slurry or other process of cement manufacture. These dusts are finely pulverized and usually average around 200 mesh. This material is of such a physical character that its high specific gravity materially assists in increasing the rate of settling of the precipitated solids as well as the completeness of the clarifying of the effluent. These waste dusts contain an average amount of lime equivalent to 15% of calcium hydroxide. They also contain ionizable salts of calcium, iron and lime equal to an average of 20% of the material by weight. These waste dusts also contain an average of 4% of potash which is recovered in the sludge removed from the sewage and greatly enhances the value of such sludge as a fertilizer. Since these waste dusts from the manufacture of cement are so finely pulverized they increase the rate of solution of the ionizable salts, thus increasing their availability.

It will be understood that the specific character of the waste dusts from the manufacture of cement will vary slightly, depending upon the particular character of the shale and the lime stone which is employed. However, the general characteristics of such waste dusts can be said to remain substantially constant. The following constitutes a representative analysis of the waste dusts collected from electrical and mechanical precipitators employed in cement manufacture:—

| | Per cent. |
|---|---|
| Mois | .13 |
| $SiO_2$ | 21.25 |
| $Al_2O_3$ | 9.20 |
| $Al_2(SO_4)3$ | 1.80 |
| $Fe_2O_3$ | 2.38 |
| $Fe_2(SO_4)3$ | .30 |
| CaO | 12.89 |
| $CaCO_3$ | 35.36 |
| $CaSO_4$ | 6.32 |
| $MgCO_3$ | 5.12 |
| $TiO_2$ | .62 |
| FeS | .24 |
| $Na_2O$ | .57 |
| $K_2O$ | 4.45 |

It is to be noted that the employment of the waste dusts herein above described, not only supplies a powerful electrolyte but also because of its finely pulverulent condition and high specific gravity, increases the rate of settling of the precipitated matter. Furthermore, the alkaline content of these waste dusts assists in the transforming of the sewage from an acid to an alkaline condition and materially decreases the quantity of the alkali, such as hydrated lime, necessary to bring about this transformation.

A typical domestic sewage was treated by my process employing the waste dusts collected from the electrical and mechanical precipitators employed in the manufacture of cement as the electrolyte producing material. This sewage showed upon analysis:

| | | |
|---|---|---|
| Total solids | 858 | P.P.M. |
| Total organic matter | 208 | P.P.M. |
| Suspended matter | 147 | P.P.M. |
| Suspended organic matter | 103 | P.P.M. |
| Organic nitrogen | 20.0 | P.P.M. |
| Albuminoid nitrogen | 6.8 | P.P.M. |
| Dissolved oxygen | .1 | P.P.M. |
| 10 days biochemical oxygen demand | 150 | |
| Total bacteria | 2,300,000 | per c.c. |
| B. coli | 222,000 | per c.c. |

In the treatment of this sewage I employed hydrated lime, waste dust, calcium sulphate, ferrous sulphate in the following proportions: hydrated lime 1.4 pounds per thousand gallons, waste dust from cement manufacture, 4.8 pounds per thousand gallons, calcium sulphate 1.0 pounds per thousand gallons, and ferrous sulphate .6 pounds per thousand gallons. The sewage was stirred so that the treating agents were uniformly distributed through the liquid. The precipitated or coagulated solids were permitted to settle. Upon analysis the effluent was found to show the following:—

| | | |
|---|---|---|
| Total solids | 505 | P.P.M. |
| Total organic matter | 42 | P.P.M. |
| Suspended matter | 16 | P.P.M. |
| Suspended organic matter | 9 | P.P.M. |
| Organic nitrogen | 4.0 | P.P.M. |
| Albuminoid nitrogen | 1.4 | P.P.M. |
| Dissolved oxygen | 4.6 | P.P.M. |
| Total bacteria | 2,400 | per c.c. |
| B. coli | 8 | per c.c. |

It will be understood that the specific proportions of the constituents of the treating mixture above given relate only to the illustrative treatment herein set forth and that the several constituents may be varied within such limits as skilled workers in the art may find advantageous to adapt the process to the treatment of any given polluted waste. As indicated in the specific proportions given, the waste dust represents the predominating constituent of the treating mixture. The exact quantity of treating mixture best adapted to the treatment of any particular polluted waste may be readily ascertained by those versed in the art of liquid purification, by making a few trial tests, noting the rapidity of precipitation, the size of the floc, and the clarification of the liquid. In the illustrative treatment above given, the total quantity of treating mixture is 7.8 pounds per 1000 gallons treated, and this quantity will be found adequate for nearly all relatively dilute wastes. More concentrated wastes will, it will be appreciated, require greater quantities of the treating mixture.

It is to be understood that the term "waste dust from cement manufacture" as used in the claims, has reference to the waste product recovered from the electrical or mechanical precipitators employed in the manufacture of cement and contemplates a product containing ionizable salts of calcium, iron and aluminum equivalent to at least substantially 20% by weight of the product and a quantity of lime approximately equivalent to 15% of calcium hydroxide, a representative analysis of which has been hereinbefore given.

From the foregoing description it will be apparent that I have not only provided an efficient process for treating domestic sewage and industrial waste but that I have also provided a process by which this accumulation of waste dust from the manufacture of cement may be most advantageously utilized, and that I have provided a novel mixture incorporating such waste dusts for use in the treating of sewage and industrial waste.

Having thus described my invention, what I claim is:—

1. A method of treating domestic sewage and industrial waste including the step of introducing to the sewage a quantity of waste dust collected from the precipitators employed in the manufacture of cement.

2. A method of treating domestic sewage and industrial waste comprising changing the sewage or waste from an acid to an alkaline condition and the introduction thereto of a quantity of waste dust from cement manufacture and a suitable coagulant.

3. A method of treating domestic sewage and commercial waste comprising intimately incorporating with the sewage or waste a mixture characterized by the fact that in excess of 50% of the mixture is waste dust from cement manufacture.

4. A method of treating domestic sewage and industrial waste comprising introducing to the sewage or waste, lime, waste dust from cement manufacture, calcium sulphate and a suitable coagulant.

5. A method of treating sewage and industrial waste to separate therefrom the bacteria and colloidal content comprising transforming the sewage from an acid to an alkaline condition, neutralizing the charge of the colloids and coagulating the precipitated matter.

6. A mixture for treating sewage and industrial waste composed of hydrated lime, waste dusts collected by the precipitators in the manufacture of cement and a suitable coagulant.

7. A mixture for use in the purification of domestic sewage and industrial waste comprising a quantity of lime, a quantity of ferrous sulphate and a quantity of waste dust from cement manufacture.

8. A mixture for use in the purification of domestic sewage and industrial waste comprising lime, waste dust from cement manufacture, and a coagulant, the quantity of waste dust being in excess of the quantity of any other ingredient in the mixture.

9. A mixture for use in the purification of sewage and industrial waste comprising lime, waste dust from cement manufacture, calcium sulphate and a coagulant, the quantity of waste dust being in excess of the total quantity of the other ingredients.

10. A mixture for use in the purification of sewage and industrial waste in which 50% of the mixture constitutes waste dust collected from the precipitators employed in the manufacture of cement.

11. A step in the process of treating polluted liquids comprising reacting on the liquid with a waste product from the manufacture of cement characterized by its content of a substantial quantity of lime and ionizable salts of strong base-forming elements.

12. A step in the process of treating polluted liquids comprising reacting on the liquid with a waste product from the manufacture of cement containing ionizable salts adapted to dissociate, produce an electrolyte, and destroy the stability of any colloids present in the liquids.

13. A process for treating polluted liquids including the step of reacting on the liquid with a reagent characterized by its content of substantial quantities of lime and ionizable metallic salts, and a lesser quantity of potash.

JOHN T. TRAVERS.